June 10, 1930.  A. L. BAUSMAN  1,763,086
APPARATUS FOR TEMPERING CHOCOLATE AND THE LIKE
Filed Dec. 7, 1928   2 Sheets-Sheet 1
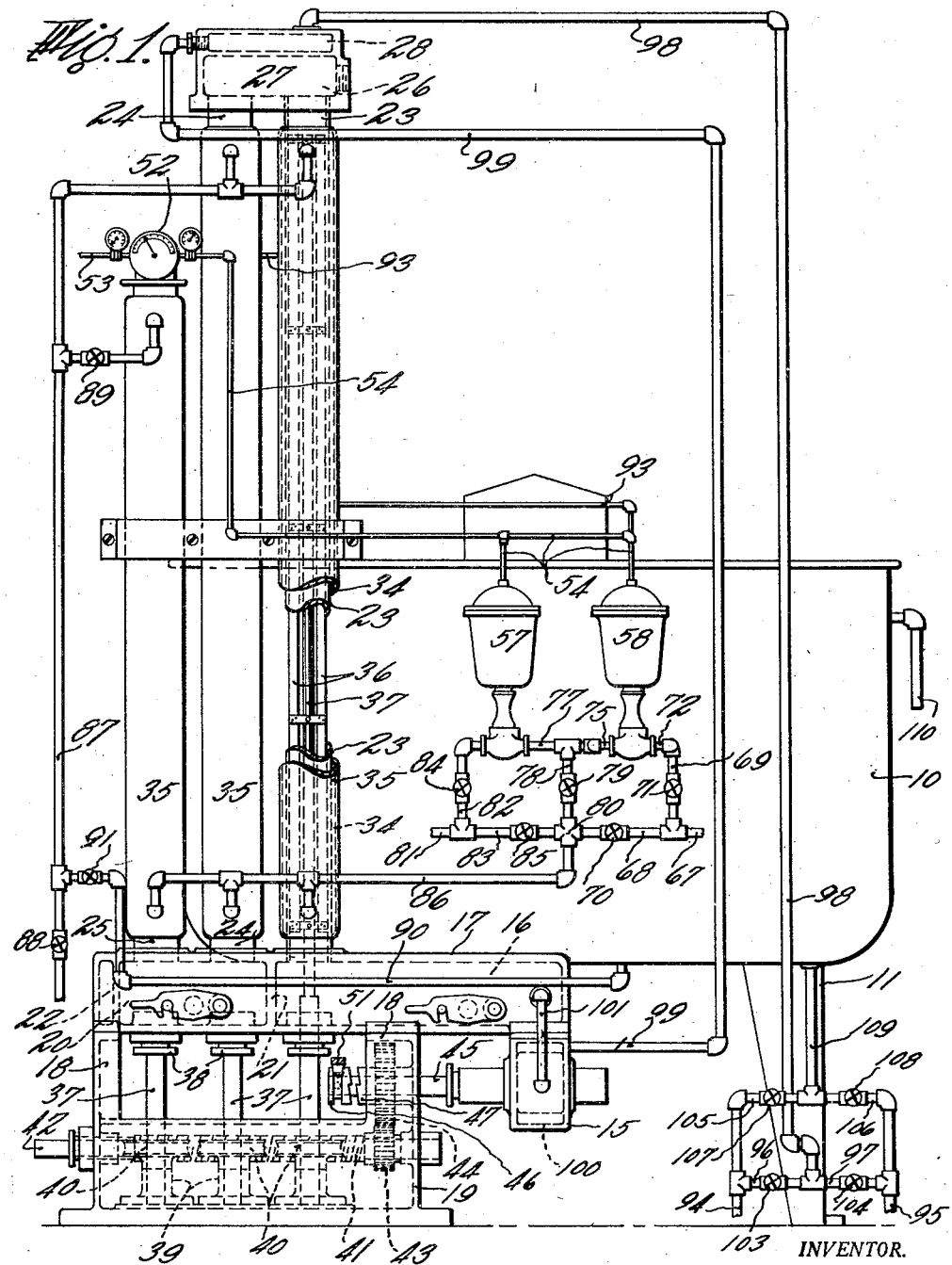
INVENTOR.
Alonzo Linton Bausman
BY Chapin & Neal
ATTORNEYS.

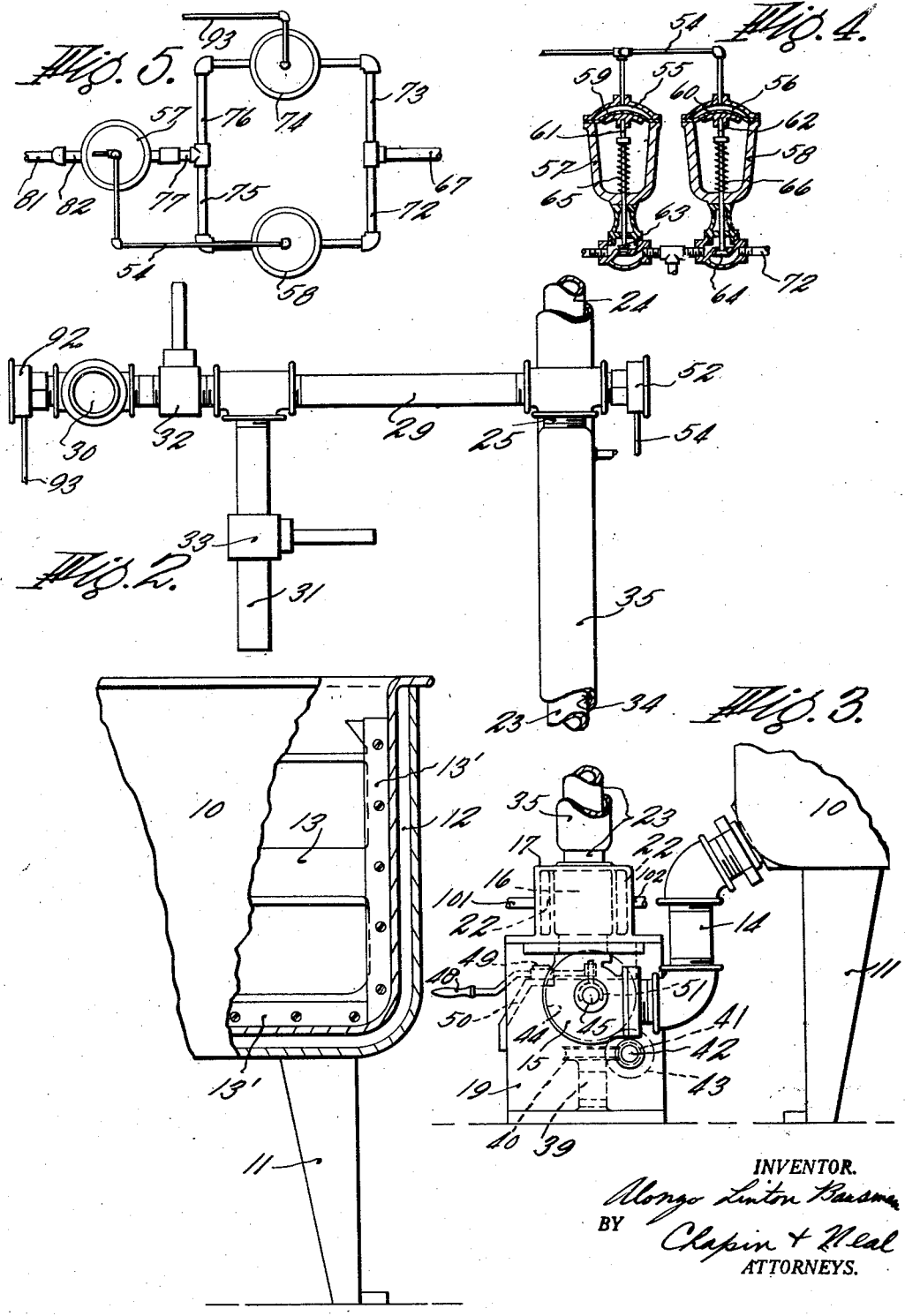

Patented June 10, 1930

1,763,086

UNITED STATES PATENT OFFICE

ALONZO LINTON BAUSMAN, OF SPRINGFIELD, MASSACHUSETTS, ASSIGNOR TO NATIONAL EQUIPMENT COMPANY, OF SPRINGFIELD, MASSACHUSETTS, A CORPORATION OF MASSACHUSETTS

APPARATUS FOR TEMPERING CHOCOLATE AND THE LIKE

Application filed December 7, 1928. Serial No. 324,552.

This invention relates to apparatus for tempering chocolate and the like.

The present invention is an improvement on my earlier invention, disclosed in U. S. Letters Patent No. 1,671,666, granted May 29, 1928. The earlier invention has been developed along special lines to solve a particular problem, which is frequently encountered in the trade and which can not be satisfactorily solved by the apparatus of my prior patent.

The problem, to the solution of which this invention is directed, requires that a large change in temperature of a large mass of chocolate be effected very rapidly and that thereafter the mass be maintained within close limits at a constant temperature. As an illustrative example, chocolate as it is taken from a refiner has a temperature of about 110 degrees Fahr., and if stored, it is usual to maintain the chocolate at a similar high temperature in the storage vessel. A large mass of chocolate, say 2,000 pounds for example, is placed in a large kettle adjacent a depositor or molding machine and this mass must be rapidly cooled down to molding temperature, say 88 degrees Fahr., and thereafter maintained within close limits, at such temperature. The apparatus of the prior patent was intended more particularly for the work of maintaining the chocolate used for coating at constant temperature. In coating, the custom is to use a much smaller kettle, say one holding about 300 pounds, and small quantities of chocolate are added from time to time to replace that used up in the coating operation. Consequently, such apparatus is not adapted for the present work which requires that a change of approximately twenty degrees be effected in substantially a ton of chocolate in a short time, say not not over thirty minutes. While the apparatus of the prior patent is satisfactory, and is being successfully used, for the purpose of maintaining constant temperature, it is necessary to make substantial changes in, and additions to the prior apparatus in order to enable it to effect the desired quick and wide change in temperature.

The provision of such changes and additions in the prior apparatus as will enable it to perform work of the stated character, constitutes the main object of this invention.

Other objects and advantages will appear from the following description and will be pointed out in the appended claims.

The invention will be disclosed with reference to the accompanying drawings, in which:—

Fig. 1 is a front elevational view of an apparatus embodying the invention;

Fig. 2 is a fragmentary side elevational view thereof with parts in section, taken from the left hand side of Fig. 1;

Fig. 3 is a fragmentary side elevational view taken from the right hand side of Fig. 1;

Fig. 4 is a sectional view showing two of the thermostatically controlled valves for controlling the heating and cooling mediums; and Fig. 5 is a plan view showing the manner of connecting all three of the thermostatically controlled valves.

Referring to these drawings; a chocolate kettle of large capacity is shown at 10. This kettle is of well known construction and includes a jacket 12 (Fig. 2) to receive a tempering fluid and the usual rotatable stirrer, which is shown in part at 13 and which has parts 13', serving to scrape the peripheral and bottom walls of the kettle. The outlet of the kettle (see Fig. 3) is connected by a pipe 14 to the inlet of a pump 15 and the outlet of the latter delivers directly into the chamber 16 of a hollow casting 17, to the under side of which near one end thereof, the pump is suitably secured. The hollow member 17 is supported at a level above the floor by legs 18 (Fig. 1) which upstand from a hollow casting 19, serving to house certain gearing as will appear. The member 17 has a second chamber 20, separated from the chamber 17 by a partition 21, and a jacket 22 to receive a tempering fluid.

Secured in and upstanding from the top wall of member 17 are three vertically disposed pipes 23, 24 and 25. The pipe 23 communicates with the chamber 16 at its lower end and at its upper end with a chamber 26 of a manifold 27, which is provided with a jacket 28 for reception of a tempering fluid. The pipe 24 is connected at its upper end to manifold 27, communicating with the chamber 26 thereof, and the lower end of this pipe communicates with chamber 20. The pipe 25 at its lower end communicates with chamber 20 and at its upper end is connected to a horizontal pipe 29 (Fig. 2) having an outlet 30 adapted to be piped to the depositor or chocolate molding machine (not shown). Pipe 29 also has an outlet through a depending pipe 31 which overlies and empties into the kettle 10. A gate valve, indicated conventionally at 32 in Fig. 2, is connected to pipe 29, located beyond the connection of pipe 31 thereto, and a similar gate valve 33 is interposed in pipe 31.

Chocolate is drawn from the kettle 10 through pipe 14 by the pump 15 and forced into chamber 16 and thence up pipe 23 into chamber 26, thence downwardly through pipe 24 into chamber 20 and thence upwardly through pipe 25 into pipe 29. From pipe 29, the pumped chocolate flows back into kettle 10 when valve 33 is opened and valve 32 closed, which conditions prevail while the initial cooling operation is being effected. By closing valve 33 and opening valve 32, the chocolate is forced by way of outlet 30 to the depositor or molding machine.

Each of the pipes 23, 24 and 25 is provided with a jacket 34 formed between the outer wall of the particular pipe and the inner wall of a larger pipe 35, which encompasses the first named pipe and has its ends closed down thereupon and welded thereto. Also in each of the pipes 23, 24 and 25, are a series of scraping blades 36, which extend longitudinally of their pipe from one end to the other of the jacketed portion thereof and contact with and scrape the inner wall thereof. These blades are suitably fixed to a vertically disposed drive shaft 37. The arrangement is, or may be, like that of my prior patent and serves a like purpose which is to prevent the chocolate from freezing to the inner walls of pipes 23, 24 or 25, during the application of the cooling medium in jackets 34.

The several shafts 37 extend through the member 17,—suitable stuffing boxes, such as 38 being provided, through which the shafts emerge from the lower wall of member 17. These shafts extend into the housing 19 and their lower ends are suitably supported therein, as by step bearings 39. A worm gear 40 is fixed to each shaft 37 and these several gears mesh with a single worm 41 fixed to, or part of, a horizontal drive shaft 42 rotatably mounted near its ends in the end walls of housing 19. Shaft 42 has fixed thereto a pinion 43, which drives a gear 44, mounted to turn freely on the drive shaft 45 of pump 15. Mounted to slide, but not to turn, on shaft 45 is a clutch element 46 adapted to engage a similar element 47 fixed to gear 44. Element 46 may be shifted into and out of engagement with element 47 by means of a lever 48 pivoted at 49 on a bracket 50 secured to housing 19. Lever 48 carries a clutch fork 51 for engagement with clutch element 46. The arrangement enables the several scrapers to be continued in operation, after pumping has ceased.

Means are provided for alternately admitting heating and cooling fluids to the jackets of pipes 23, 24 and 25 and such means are automatically controlled by temperature variations in the chocolate, preferably according to the temperature prevailing in pipe 29. To this end, I provide a thermostatic regulator 52, of any suitable type, which has a sensitive element responsive to the temperature of the chocolate (as that flowing in pipe 29) and which will admit fluid under pressure, such as compressed air for example, from a supply pipe 53 to a pipe 54 whenever the temperature of such chocolate exceeds the desired predetermined temperature and vent the pipe 54 whenever the temperature of such chocolate is less than the desired predetermined temperature. One example of a suitable regulator for effecting these results is disclosed in my prior patent and detailed description of it need not be repeated here.

Referring to Fig. 4, pipe 54 is connected to the air chambers 55 and 56 of two valves designated generally as 57 and 58. Admission of compressed air to both chambers occurs simultaneously and the diaphragms 59 and 60, which form the lower walls of such chambers, are depressed and in turn depress the respective valve stems 61 and 62. The valves 63 and 64, carried by these stems, are closed and opened respectively, by such action. When pipe 54 is vented, the valves 63 and 64 are opened and closed, respectively, by springs 65 and 66 which tend to lift their stems. Valve 63 controls the admission of steam, or other heating fluid, and valve 64 the admission of cold water, or other cooling medium.

The cold water supply pipe 67 (Fig. 1) is connected to supply horizontal and vertical branch pipes 68 and 69. Interposed in pipes 68 and 69 are valves 70 and 71. The upper end of pipe 69 feeds two branch pipes 72 and 73 (Fig. 5) and pipe 72 leads to valve 58. Pipe 73 leads to a valve 74 which is a duplicate of valve 58 and is used for a purpose later to be described. The valves 58 and 74 are connected by pipes 75 and 76 to a pipe 77 which is connected to the outlet of valve 57. Pipe 77 is connected by a vertical pipe 78 (Fig. 1) having a valve 79 therein, to a cross fitting 80, to which is also connected the pipe 68. The steam supply pipe 81 connects with vertical and horizontal branch pipes 82 and 83 having valves 84 and 85, respectively, therein. Pipe 82 leads to the inlet of valve 57 and pipe 83 leads to the cross fitting 80. An outlet pipe 86 leads from fitting 80 and is connected to the lower ends of the three jackets 34. Normally valves 71, 79 and 84 are open and valves 70 and 85 are closed. The valves 57 and 58 then control the tempering fluid, admitting steam or cold water to pipe 86 according to the demands of thermostat 52. By closing valves 71, 79 and 84, the admission of tempering fluid to pipe 86 may be manually controlled with valves 70 and 85 and steam or cold water or a mixture of both may be supplied to jackets 34.

The outlets for the several jackets 34 are at the upper ends of their respective pipes and these outlets are connected to a common discharge pipe 87 having a valve 88 therein. A valve, such as 89, may be used to throttle down the outlet of each jacket 34, as I have shown in the case of the outlet for the jacket of pipe 25. The discharge pipe 87 is connected by a pipe 90 to the jacket 12 of kettle 10 and a valve 91 is interposed in such pipe to enable the tempering fluid to be shut off from the kettle. Valve 91 is normally open and valve 88 closed. Valve 88 should be opened when valve 91 is closed.

As a desirable refinement, which is important and preferred although not necessarily essential in all cases, I provide the second valve 74, above described, and control it by an independent thermostat 92 (Fig. 2), the sensitive element of which is located in pipe 29. Thermostat 92 functions similarly to thermostat 52 and serves to admit fluid under pressure to a pipe 93 whenever the temperature of the chocolate in pipe 29 is greater than a certain predetermined temperature and at other times to vent pipe 93. The latter, as shown in Fig. 5, is connected to valve 74. Valve 74 is exactly like valve 58 and like that valve controls the cold water supply. Therefore, the admission of compressed air to pipe 93 will open valve 74 and allow cold water to pass from branch pipe 73 to branch pipe 76. The branch pipes 73 and 76 and the branch pipes 72 and 75 are of smaller size than the inlet and outlet pipes 69 and 77 respectively. The combined areas of pipes 72 and 73 or of pipes 75 and 76 is substantially equal to the area of pipe 69 or that of pipe 77. The thermostat 92 is set to respond to a slightly higher temperature than thermostat 52. For example, when the temperature of the chocolate falls to 89 degrees, the thermostat 92 will function to close valve 74 and thus materially diminish the flow of cold water to the jackets 16 and 12. Thermostat 52, however, will not operate to close valve 58 until the chocolate has reached the desired molding temperature, say 88 degrees. This arrangement enables a large flow of cold water to be maintained to effect rapid lowering of temperature over the wide range initially required and at the same time permits closer regulation of the temperature after the chocolate has been brought down in temperature to approximately that required for molding.

As set forth in my prior patent, it is essential to scrape those walls which are subjected to the cooling medium because the temperature of such medium is well below the freezing point of the chocolate. The scrapers 36 and 13' prevent the chocolate from freezing to the inner walls of the pipes 23, 24 and 25 and the inner walls of kettle 10 and also cause the cooler parts of the chocolate, which lie nearer the jackets, to be mixed with the warmer parts at more remote points. The problem, which arises here, is to provide a much greater cooling area and the single pipe shown in my prior patent will not do as a practical matter. One pipe, if used, would have to be straight in order to enable it to be scraped by simple means and there is not ordinarily room for the installation of one straight pipe of the necessary length, whether that pipe be placed vertically or horizontally. The length of pipe required is such that the outlet end thereof would be too remote from the kettle. Accordingly, at least two pipes are required with at least one cross connection, such as the manifold 27. As a practical matter, and having in mind space limitations in the factories where apparatus, such as this is used, I have found it desirable to use three pipes, as shown, and have them disposed vertically. Also, for convenience in gearing together the several scraper shafts, the pipes should be arranged in parallel relation.

The described arrangement necessarily is such that there are certain parts in the conduit which cannot be easily scraped. For example, the cross-over connections 20 and 26 and chamber 16 present difficulties in this respect. Particularly, some of the chocolate delivered from the upper end of pipe 23 into chamber 26 may be so cold as to freeze to the walls of this chamber and a similar condition may obtain in chamber 20. Accordingly, the jackets for these chambers, as well as that for chamber 16, have not been included in the circuit controlled by valves 57, 58 and 74 because the cooling medium admitted by valves 58 and 74 would cause freezing of chocolate and clogging of the chambers. Such jackets on the contrary, are connected in a separate circuit wherein a tempering fluid is circulated which will not only not cause freezing but which will prevent clogging due to cold chocolate from the pipes 23 or 24 entering the chambers 26 or 20, respectively.

Referring to Fig. 1, 94 and 95 are steam and water supply pipes, which are connected by pipes 96 and 97, respectively, to a common pipe 98, leading to jacket 28. A pipe 99 connects the outlet of the latter to the jacket 100 of pump 15 and the outlet of jacket 100 is connected by a pipe 101 to the jacket 22 of member 17. Jacket 22 has a discharge pipe 102 (see Fig. 3). Valves 103 and 104 are provided in pipes 96 and 97, respectively, and by a proper opening of both these valves a flow of water through pipes 98, 99, 101 and the jackets to which they are connected, may be maintained at a temperature such as to prevent freezing of chocolate and clogging of the chambers 16, 20 and 26.

The steam and water pipes 94 and 95 are also connected by pipes 105 and 106, having valves 107 and 108 therein, to a common pipe 109 which leads to the jacket 12 of kettle 10. The jacket 12 has a discharge pipe 110. The valves 107 and 108 are normally closed because the jacket 12 is usually supplied from pipe 90 under the automatic control. However, when such control of the fluid in jacket 12 is not desired, valve 91 may be closed and valves 107 or 108 or both be opened to secure manual regulation of the temperature in kettle 10. Valve 107 alone would be opened if and when it is necessary to thaw out the chocolate in kettle 10, as for example when any is left there overnight. So also, valve 108 might alone be opened, while valve 91 was also opened to accelerate cooling; or both valves 107 and 108 may be opened at the same time, which is sometimes done after the chocolate has been cooled down to the desired temperature for molding. Any subsequent cooling can be adequately cared for in the pipes 23, 24 and 25 and the kettle jacket 12 can then be shut off from the automatic control by closing valve 91. Valves 107 and 108 would then be opened and adjusted so that the temperature of fluid admitted to jacket 12 would be right to keep the chocolate warm and as near as may be at the proper temperature.

In operation, kettle 10 is filled to capacity with chocolate (say 2000 pounds) and this chocolate is at a temperature far above that suitable for molding. For example, the chocolate placed in kettle 10 may have a temperature of 110 degrees, whereas molding temperature is around 88 degrees. Power is applied to shaft 42 and the several sets of scrapers 36, as well as pump 15, are set in motion. Valve 32 will be closed and valve 33 opened. Chocolate will thus be circulated from kettle 10 through the conduit which includes the several pipes 23, 24, 25, 29 and 31 and connecting parts. The sensitive elements of the thermostats being engaged by the hot chocolate will cause both cold water valves 58 and 74 to open and steam valve 57 to close. A full flow of cold water then passes through the jackets of pipes 23, 24 and 25 and the jacket 12 of kettle 10. The large stream of chocolate forced at considerable velocity through said conduit is cooled rapidly due to the large cooling area afforded by the plurality of jacketed pipes and that afforded by the jacket 12. After a suitable interval has elapsed, say not over thirty minutes, the temperature of the chocolate will be brought down close to the molding temperature and thermostat 92 will then cause valve 74 to close and throttle down the cold water supply. Shortly afterwards the temperature of the chocolate will reach the desired temperature and thermostat 52 will cause valve 58 to close and valve 57 to open. Valve 32 will then be opened and valve 33 closed, or partially closed, to enable chocolate to be supplied to the depositor or molding machine in suitable quantities. Valve 91 may then be closed to cut off the kettle jacket 12 from the automatically controlled supply of tempering fluid and valves 107 and 108 opened to supply such jacket from the alternative source, above described. From this point on, the apparatus will operate as in said prior patent, the valves 57 and 58 being operated to alternately supply heating and cooling mediums to the jackets 34 as called for by the thermostat 52.

While the invention has been disclosed as designed to effect a quick lowering of temperature over a wide range it is equally capable of effecting a quick increase of temperature over a wide range, should such result be desired. The additional thermostat and the valve controlled thereby should then cooperate with the steam valve in a similar manner to that in which it cooperates with the water valve 58.

This additional valve, while in many cases desirable and therefore important and preferred, may also in other cases be omitted. For instance, one could throttle down the cold water supply by manually closing the valve (not shown) in the water main which supplies pipe 67, if and when the cold water supply interferes with the desired close regulation of the temperature of the chocolate. Thus, while it is desirable to effect the throttling down of the cold water supply automatically at the proper time, the apparatus is not dependent thereon and may be used satisfactorily for its intended work without this particular automatic feature.

The invention has been disclosed herein, in an embodiment at present preferred, for illustrative purposes, but the scope of the invention is defined by the appended claims rather than by the foregoing description.

What I claim is:

1. Apparatus for cooling chocolate or the like comprising, a kettle for the chocolate, a series of straight pipes, each of said pipes encompassed by a jacket which extends substantially from end to end thereof, cross connections between one end of each pipe of the series and the adjacent end of the next pipe of the series, a pump and connections therefrom to the kettle and the free end of the first pipe of the series, the free end of the last pipe of said series connected to discharge into said kettle, means for circulating in said jackets a cooling medium having a temperature well below the freezing point of the chocolate, means movable in each of said pipes to prevent the chocolate from freezing to the inner walls thereof, said cross connections having jackets, and means for circulating a tempering medium in the jackets of said cross connections to prevent the chocolate from clogging the same as it passes from one pipe of the series to another.

2. Apparatus for cooling chocolate or the like, comprising, a kettle for the chocolate, a series of straight pipes mounted in parallel relation, each of said pipes encompassed by a jacket which extends substantially from end to end thereof, cross connections between one end of each pipe of the series and the adjacent end of the next pipe of the series, a pump and connections therefrom to the kettle and the free end of the first pipe of the series, the free end of the last pipe of said series connected to discharge into said kettle, means for circulating in said jackets a cooling medium having a temperature well below the freezing point of the chocolate, rotary scraping means movable in each of said pipes to prevent the chocolate from freezing to the inner walls thereof, a power shaft, connections between said shaft and said several scraping means, said cross connections having jackets, and means for circulating a tempering medium in the jackets of said cross connections to prevent the chocolate from clogging the same as it passes from one pipe of the series to another.

3. Apparatus for cooling chocolate or the like, comprising, a kettle for the chocolate, a series of straight pipes mounted in upstanding and spaced parallel relation, each of said pipes encompassed by a jacket which extends substantially from end to end thereof, cross connections between one end of each pipe of the series and the adjacent end of the next pipe of the series, a pump and connections therefrom to the kettle and the free end of the first pipe of the series, the free end of the last pipe of said series connected to discharge into said kettle, means for circulating in said jackets a cooling medium having a temperature well below the freezing point of the chocolate, rotary scraping means movable in each of said pipes to prevent the chocolate from freezing to the inner walls thereof, a power shaft, connections between said shaft and said several scraping means, said cross connections having jackets, and means for circulating a tempering medium in the jackets of said cross connections to prevent the chocolate from clogging the same as it passes from one pipe of the series to another.

4. Apparatus for cooling chocolate or the like comprising, a kettle for the chocolate, a pump for drawing chocolate from the kettle, a conduit through which the chocolate is forced by said pump and by which it is delivered back into said kettle, said conduit having a jacket, connections by which a cooling medium is admitted to said jacket, a valve in said connections operable to throttle down the flow of cooling medium to said jacket, a second valve in said connections operable after said flow has been throttled down by the first named valve to cut off such flow altogether, means responsive to the temperature of the chocolate flowing in said conduit to operate the first named valve when such temperature is reduced approximately to the desired predetermined temperature, and separate means also responsive to the temperature of such chocolate to operate the second named valve when such temperature is reduced to the predetermined temperature desired.

5. Apparatus for tempering chocolate or the like comprising, a kettle for the chocolate, a pump for drawing chocolate from the kettle, a conduit through which the chocolate is forced by the pump and by which it is delivered back into the kettle, said conduit having a jacket, connections for admitting a heating and a cooling medium to said jacket, a valve in each of said connections, means responsive to the temperature of the chocolate flowing in said conduit for operating said valves, closing one and opening the other and vice versa, accordingly as such chocolate is above or below the desired predetermined temperature, a third valve arranged in one of said connections and operable to throttle down the flow therethrough when the temperature of the chocolate approaches closely to the desired predetermined temperature, and means independent of the last named means and responsive to the temperature of the chocolate flowing in said conduit to operate said third named valve when such temperature approaches but before it reaches said predetermined temperature.

6. Apparatus for tempering chocolate or the like comprising, a kettle for the chocolate, a pump for drawing chocolate from the kettle, a conduit through which the chocolate is forced by the pump and by which it is delivered back into the kettle, said conduit having a jacket, connections for admitting a heating and a cooling medium to said jacket, a valve in each of said connections, means responsive to the temperature of the chocolate flowing in said conduit for operating said valves, closing one and opening the other and vica versa, accordingly as such chocolate is above or below the desired predetermined temperature, a third valve arranged in one of said connections and effective when open to increase the flow of tempering fluid and accelerate a temperature change in the chocolate, whereby a wide change in temperature may be more speedily effected, means responsive to the temperature of the chocolate flowing in said conduit and operable at a different temperature than the other valve in the same one of said connections to open said third valve when such temperature departs beyond a definite limit from the predetermined temperature and to close down said valve when the temperature of the chocolate is betwen such limit and the desired predetermined temperature.

In testimony whereof I have affixed my signature.

ALONZO LINTON BAUSMAN.